United States Patent [19]

LeBlanc et al.

[11] 4,295,966

[45] Oct. 20, 1981

[54] APPARATUS FOR REMOVING CONTAMINANTS FROM LUBRICATING OIL

[76] Inventors: Ralph W. LeBlanc; Robert M. Bingham, both of P.O. Box 52734, New Orleans, La. 70152

[21] Appl. No.: 169,893

[22] Filed: Jul. 17, 1980

[51] Int. Cl.³ .............................................. B01D 35/18
[52] U.S. Cl. .................................... 210/180; 210/184; 210/436; 196/46.1
[58] Field of Search ............... 210/167, 168, 180, 184, 210/185, 186, 249, 253, 340, 341, 232, 238, 183, 436; 196/46.1, 128

[56] References Cited

U.S. PATENT DOCUMENTS

| | | | |
|---|---|---|---|
| 2,086,762 | 7/1937 | Bradford | 210/180 |
| 2,086,763 | 7/1937 | Bradford | 210/180 |
| 2,088,243 | 7/1937 | Koinzan | 210/180 |
| 2,133,359 | 10/1938 | Miller | 196/16 |
| 2,173,631 | 9/1939 | Niedens | 210/180 |
| 2,207,399 | 7/1940 | Gaertner | 210/180 |
| 2,274,132 | 2/1942 | Ehlers | 210/180 |
| 2,289,553 | 7/1942 | Root | 210/180 |
| 2,346,042 | 4/1944 | Morris | 210/180 |
| 2,377,988 | 6/1945 | Braun | 210/184 |
| 2,388,821 | 11/1945 | Braun | 210/180 |
| 2,411,539 | 11/1946 | Gunn | 210/340 |
| 2,428,939 | 10/1947 | Morris | 210/180 |
| 2,432,475 | 12/1947 | Griffith | 210/180 |
| 2,635,759 | 4/1953 | Schwalge | 210/180 |
| 2,645,607 | 7/1953 | Allen | 210/180 |
| 2,785,109 | 3/1957 | Schwalge | 210/180 |
| 2,839,196 | 6/1958 | Schwalge | 210/180 |
| 2,909,284 | 10/1959 | Watkins | 210/180 |
| 3,235,084 | 2/1966 | King | 210/180 |
| 3,241,677 | 3/1966 | Schmitz | 210/180 |
| 3,550,781 | 12/1970 | Barrow | 210/180 |
| 3,616,885 | 11/1971 | Priest | 210/180 |
| 3,756,412 | 9/1973 | Barrow | 210/180 |
| 3,845,751 | 11/1974 | Runstetler | 210/180 |
| 3,916,860 | 10/1975 | Priest | 210/180 |
| 4,006,084 | 2/1977 | Priest | 210/180 |
| 4,093,548 | 6/1978 | Sterkenburg | 210/180 |
| 4,115,201 | 9/1978 | Malec | 210/180 |
| 4,146,475 | 3/1979 | Forsland | 210/180 |
| 4,189,351 | 2/1980 | Engel | 210/180 |

FOREIGN PATENT DOCUMENTS

469087  7/1937  United Kingdom ............... 210/180

Primary Examiner—Ernest G. Therkorn
Attorney, Agent, or Firm—Fishburn, Gold and Litman

[57] ABSTRACT

An oil refiner is provided with a fluid containment vessel which is divided into an upper chamber and a lower chamber by a domed plate. The vessel also has a top with a fluid channel therein. The vessel lower chamber contains a filter media preferably enclosed in a cartridge. Oil to be refined is conducted first through the fluid channel in the vessel top, then through the filter media preferably being evenly dispersed into a lower region of the filter media by a radially directing nozzle with a plurality of angularly spaced openings therein. After flowing through the filter media the oil passes through the capillaries in the plate onto a dome shaped evaporation surface thereof. The oil spreads over the evaporation surface in a generally uniform manner even when the vessel is tilted from side to side. A plurality of ribs are positioned on the evaporation surface so as to divide the surface into sections such that oil in adjacent sections is restrained from mixing, thereby also making the refiner less sensitive to tilting of the vessel. Volatile contaminants evaporated from the oil are exhausted through a vent and the contaminant free oil exits, under the force of gravity, from the vessel through a conduit, which conduit returns the oil to a storage container.

11 Claims, 9 Drawing Figures

APPARATUS FOR REMOVING CONTAMINANTS FROM LUBRICATING OIL

BACKGROUND OF THE INVENTION

The present invention relates to an apparatus for continuously removing particulate and volatile contaminants from engine lubricating oil and, in particular to such an apparatus wherein the oil flows over an evaporation surface such that heat drives volatile contaminants therefrom and wherein the heat is substantially provided by the oil itself. In addition the apparatus is especially suitable for use on machinery or boats wherein the apparatus is not fixed in a constant position but rather continuously tilts or rocks back and forth from a vertical orientation.

The present invention is related to our copending allowed application entitled MANIFOLDING SYSTEM FOR OIL REFINERS, Ser. No. 167,778, wherein is disclosed a manifolding and ganging apparatus which allows multiple standard sized refiners according to the present invention to be effectively used as a single unit.

It has long been recognized that lubricating oil contamination in engines is a major cause of wear and damage to such engines. Therefore, numerous conventional devices under the name of refiners, purifiers, rectifiers, or the like have been developed to remove such contamination from the oil. These devices often include filter media to remove particulate matter such as sludge, metal pieces, carbon or the like and a dispersion or evaporation surface over which the oil is passed in a relatively thin layer which surface is heated so that volatile impurities such as water, fuel fractions, or the like are driven into a surrounding chamber which in turn is vented to exhaust the volatiles to the atmosphere.

Preferably, oil refiners should filter out particles which are about 1 to 3 microns in size or larger, absorb liquid contaminants in the filter media, somewhat neutralize acidic oil in the filter media, and provide for the evaporation of volatile contaminants from the oil in a consistent and uniform manner.

In order to distribute the oil in a relatively thin layer so as to improve evaporation of volatiles therefrom, the evaporation surface of many conventional refiners is frustoconical in shape with spaced horizontal tiers or steps therealong. Such tiered surfaces provide satisfactory even layering of the oil thereon for maximization of evaporation of volatile contaminants as long as the associated refiners is fixed in position and the tiers are always horizontal. However, for many engines which are in boats or various mobile machinery and which are frequently tilted or tend to rock back and forth, the tiers do not remain in a horizontal position and hence the oil tends to collect unevenly on the tiers such that too thick a layer of oil is formed on one side thereof and too thin a layer is formed on the opposite side; if at all. The present invention has resolved the problems of providing a uniform layer by making the evaporation surface relatively insensitive to tilting or rocking of the refiner. In particular the evaporation surface of the present invention is dome shaped with the oil being placed thereon near the top thereof. In addition ribs are provided which divide the evaporation surface into sections and restrict flow of oil between adjacent sections.

It has also been found that when the oil is placed at atmospheric pressure on the evaporation surface with air circulating thereabout, the volatile contaminants will evaporate without need for external heat from such sources as an electrical resistance coil, such as are commonly used in the conventional art, if the heat of the oil itself is indirectly utilized to heat an evaporation chamber above the evaporation surface. Heating the chamber urges volatiles into the air contained in the chamber and tends to prevent condensation of the volatiles on the walls of the chamber.

In addition, it is desirous to have a refiner wherein all oil entering the refiner flows through a maximum amount of filter media and that all of the oil is subjected to passage over the evaporation surface such that a maximum amount of contaminants is removed from essentially all the oil passing through the refiner.

It is also desirous that the refiner be relatively easy to maintain and in particular that the filter media be subject to quick and easy replacement.

OBJECTS OF THE INVENTION

Therefore, the objects of the present invention are: to provide a refiner for removing solid contaminants from lubricating oil; to provide such a refiner which removes volatile contaminants from oil by dispersion of the oil on an evaporation or dispersion surface which is relatively insensitive with respect to tilting or rocking of the refiner with regard to the ability thereof to spread the oil in a relatively thin even layer thereon; to provide such a refiner having a dome shaped dispersion surface upon which oil is placed near the top thereof; to provide such a refiner including ribs positioned on the dispersion surface and being joined near the top of the surface so as to divide the surface into sections and thereby makes evaporation from the oil dispersed on the surface even more insensitive to tilting or rocking of the refiner; to provide such a refiner which utilizes heat from the oil before refining same to assist in evaporating volatile contaminants from the oil while flowing over the dispersion surface; to provide such a refiner including filter media for removing particulate contaminants which media is contained in a sock or container to assist in changing such media after absorption of contaminants thereby; to provide such a refiner having a distribution nozzle which evenly distributes oil so as to maximize the amount of cleaning of the oil provided by the filter media and which controls oil flow volumes through the refiner; to provide such a refiner wherein the filter media nominally absorbs liquid contaminants and tends to neutralize acidic oil; to provide such a refiner which is relatively easy to dismantle for changing the filter media and otherwise maintain; to provide such a refiner which is easy to manufacture, relatively inexpensive to produce and efficient in use, and particularly well adapted for the proposed usage thereof.

Other objects and advantages of this invention will become apparent from the following description taken in connection with the accompanying drawings wherein are set forth by way of illustration and example, certain embodiments of this invention.

SUMMARY OF THE INVENTION

A refiner is provided for removing contaminants from lubricating oil. The refiner has filter media therein for removing particulate matter from oil passing therethrough and to also absorb at least a portion of liquid contaminants therein. The filter media has nominal acid neutralizing properties and is enclosed in a suitable casing such that the filter media can be removed and replaced as a unit. A distributer is located at the bottom of the filter media and functions to evenly distribute oil such that same will uniformly flow through the filter media without channeling.

The refiner is divided into a lower and an upper portion by an evaporator plate having an evaporation or dispersion surface thereon. The upper refiner portion includes an evaporation chamber positioned over the dispersion surface. The evaporation surface is arcuate and preferably dome shaped. The dispersion surface includes ribs thereon which preferably extend from near a center of the dispersion surface to near the periphery thereof thereby dividing the dispersion surface into pie shaped sections. The evaporator plate includes capillaries therethrough which open onto the dispersion surface, preferably near the top of the sections, and conduct or transfer oil that has passed through the filter media to the dispersion surface upon which the oil flows in a relatively thin film or layer. The ribs restrict flow of the oil between the various sections, which restriction preferably in conjunction with the dome shape of the evaporation surface functions to maintain uniformity in the layer of oil on the dispersion surface and to thereby provide less sensitivity in the refiner process of removing volatile contaminants from the oil than is found in conventional refiners. In one embodiment the ribs are serpentine or spiral shaped to further make the evaporation surface insensitive to tilting.

In particular the ribbed or spiral dispersion surface has the following decided advantages over the conventional design dispersion plates now in use. The ribbed or spiral characteristics of the dispersion surface disperses the oil flow evenly over the surface even when the surface is rocking or the base thereof is angled with respect to horizontal. Conventional dispersion plates when operated in any position wherein the base thereof is not horizontal or the axis of the dispersion surface is not in a perpendicular position generally display characteristics wherein the oil flow tends to concentrate on relatively small surface areas of the plate, thereby resulting in uneven evaporation of volatiles from the oil. A uniform distribution and thickness of oil film over the entire plate surface area is important to the efficiency of the evaporation process in the upper portion of the refiner operation. Conventional dispersion plates operated at other than the perpendicular position of the axis of such a surface will not maintain a uniform oil film thickness over the plate surface. Exposed surface areas on conventional dispersion plates, created by non-uniformity of oil flow over the plate under other than ideal operating conditions, result in the exposed areas of the plate becoming heated to excessive temperature from the heat radiated by an electrically heated head or the like, and this causes or speeds up the oxidation process of the oil when the oil comes in contact with such heated exposed plate areas during operation. The ribbed or spiral plate in conjunction with the capillaries tends to substantially eliminate exposure of the oil to excessively heated areas on the plate surface both when the plate design of the present application is used in combination with an electrically heated head or with an oil heated head also disclosed in the present application. In addition, the oil heated head would tend to not produce excessive heat to exposed areas of conventional dispersion plates because the head will not radiate heat in excess of the temperature of the engine oil operating temperature. The ribbed or spiral dispersion plate virtually never exposes any portion of the flow area of the plate due to the segmented (ribbed pie shaped or ribbed spiral) configuration of this new plate. Conventional refiners when operating under conditions wherein the axis of the dispersion surface is not vertical will tend to "bunch up" or confine oil flow to a small section of the plate; whereas the ribbed and sectionalized configuration in conjunction with associated capillaries wherefrom oil flows onto each section of the plate of the present application prevents this type of non-uniformity of flow.

The oil to be refined is preferably first circulated through a head of the refiner in closely spaced relation to the evaporation chamber whereby the chamber is heated by the oil which is normally relatively warm compared to the temperature whereat the volatile contaminants in the oil will evaporate. The main function of warming the evaporation chamber by the oil in the head is to warm the air therein so as to improve the volatile holding capacity thereof and to prevent condensation of evaporated volatile contaminants on the lower surface of the head.

The drawings constitute a part of this specification and include exemplary embodiments of the present invention and illustrate various objects and features thereof.

BRIEF DESCRIPTION OF THE DRAWINGS

FIG. 5 is a top plan view of the refiner of FIG. 2 showing various internal features thereof in phantom.

DETAILED DESCRIPTION OF THE PREFERRED EMBODIMENT

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figures 1, 3:
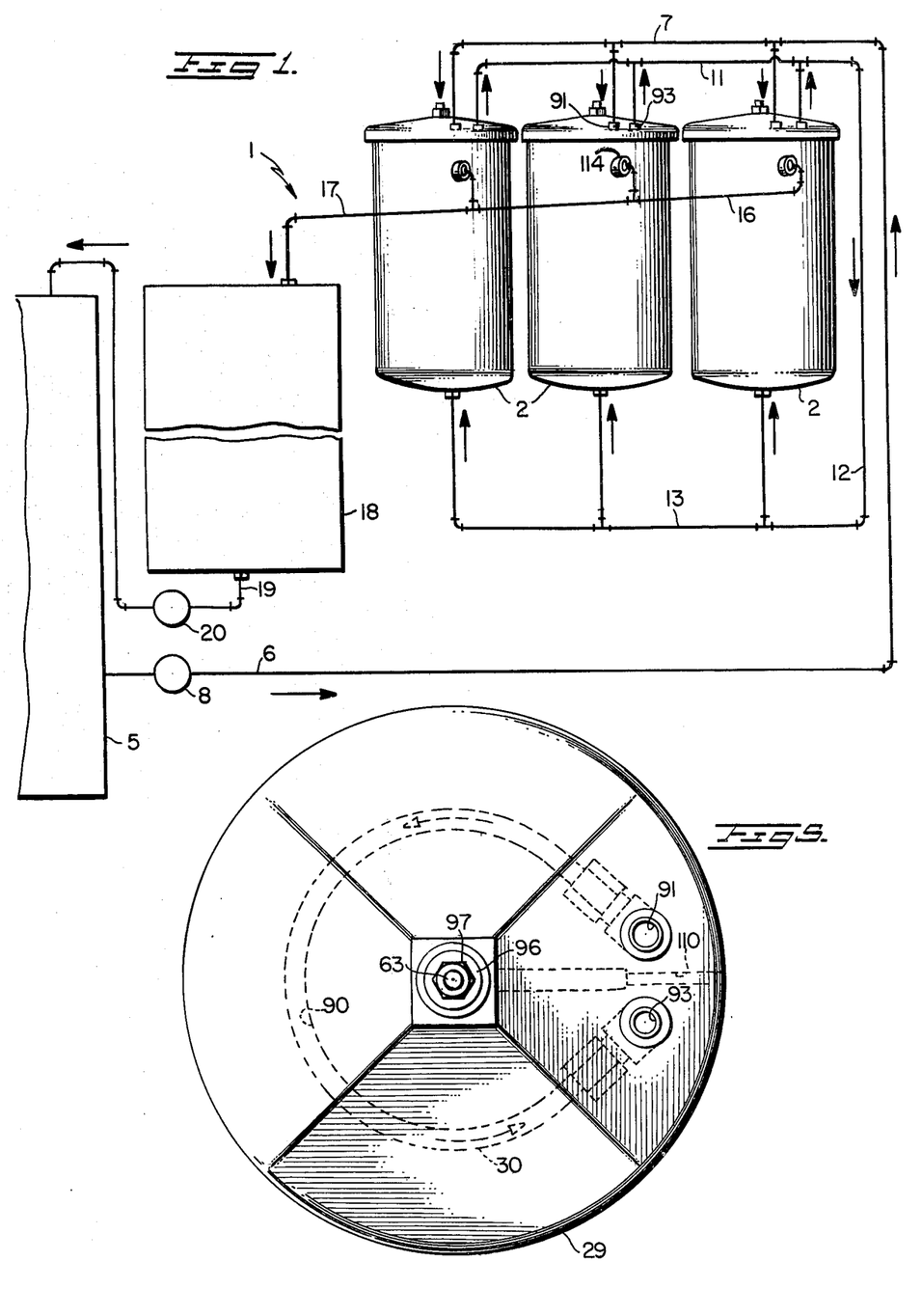
FIG. 1 is a partly schematic view of a lubricating oil system for an engine including three oil refiners according to the present invention.
FIG. 3 is an enlarged perspective view of the dispersion of the oil refiner of FIG. 2.
Figure 7:
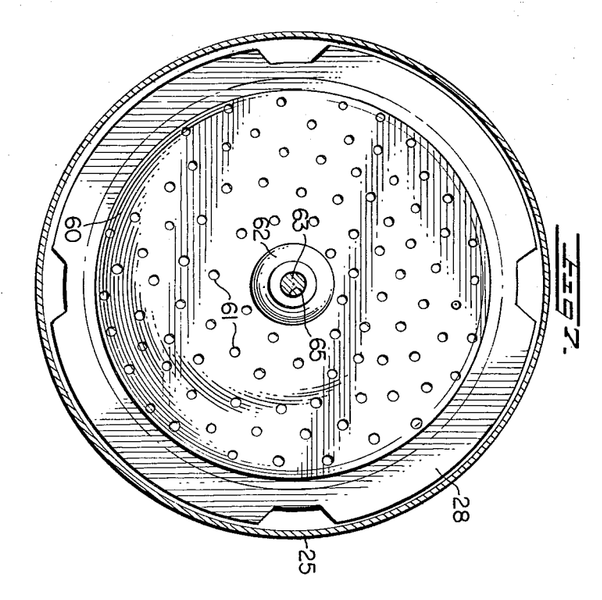
FIG. 7 is a cross-sectional view of the refiner taken along line 7—7 of FIG. 2.
Figures 8, 9:
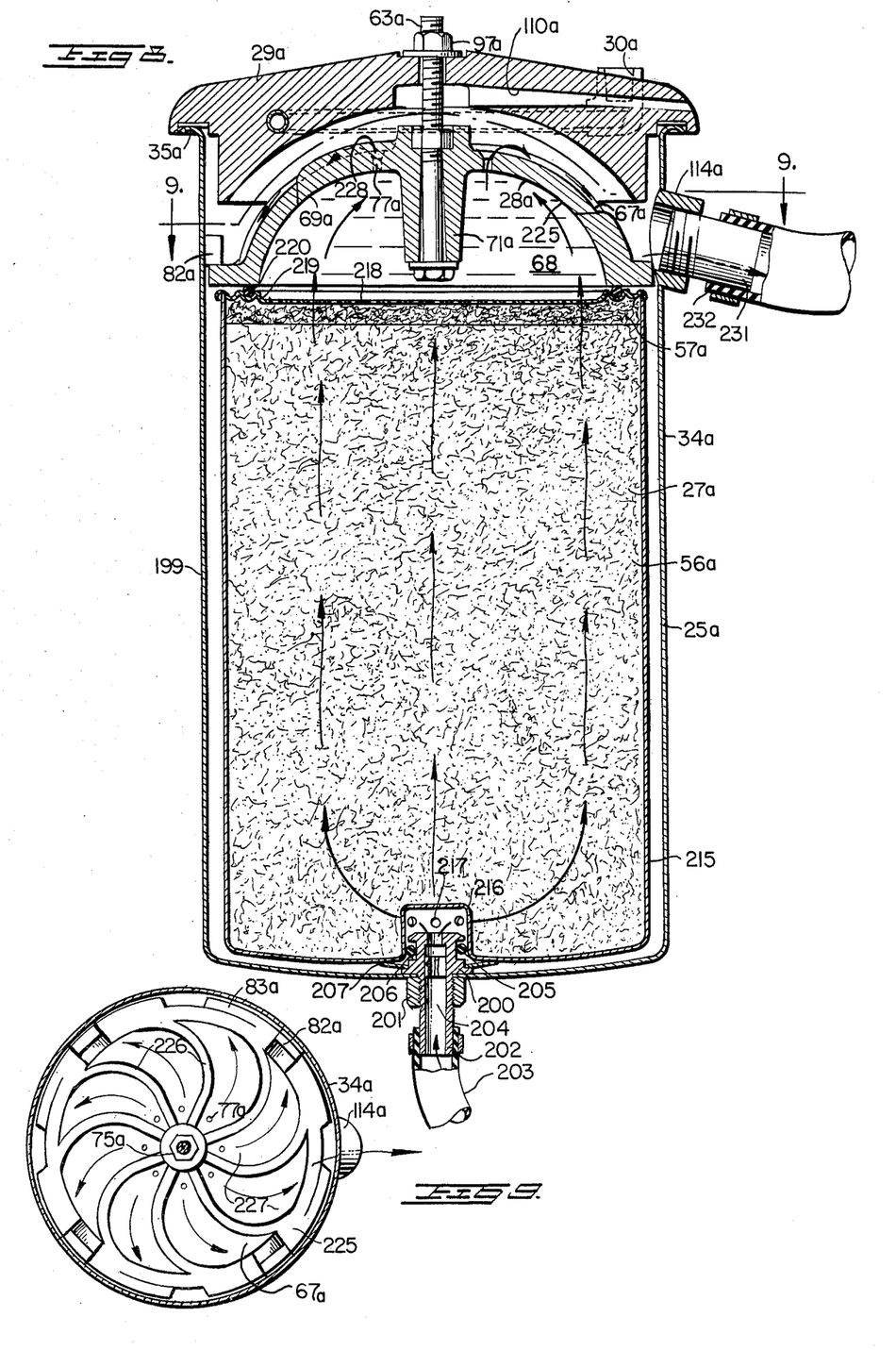
FIG. 8 is a vertical cross-sectional view of a modified oil refiner according to the present invention.
FIG. 9 is a cross-sectional view of the modified oil refiner taken along line 9—9 of FIG. 8.

The reference numeral 1 generally designates an oil circulation system, as seen in FIG. 1, including three oil purifiers, rectifiers, reclaimers, or refiners 2. The refiner 2, as best seen in FIGS. 2 through 7 represents a first embodiment of the present invention. A modified oil refiner is shown in FIGS. 8 and 9.

Figures 2, 3, 4:
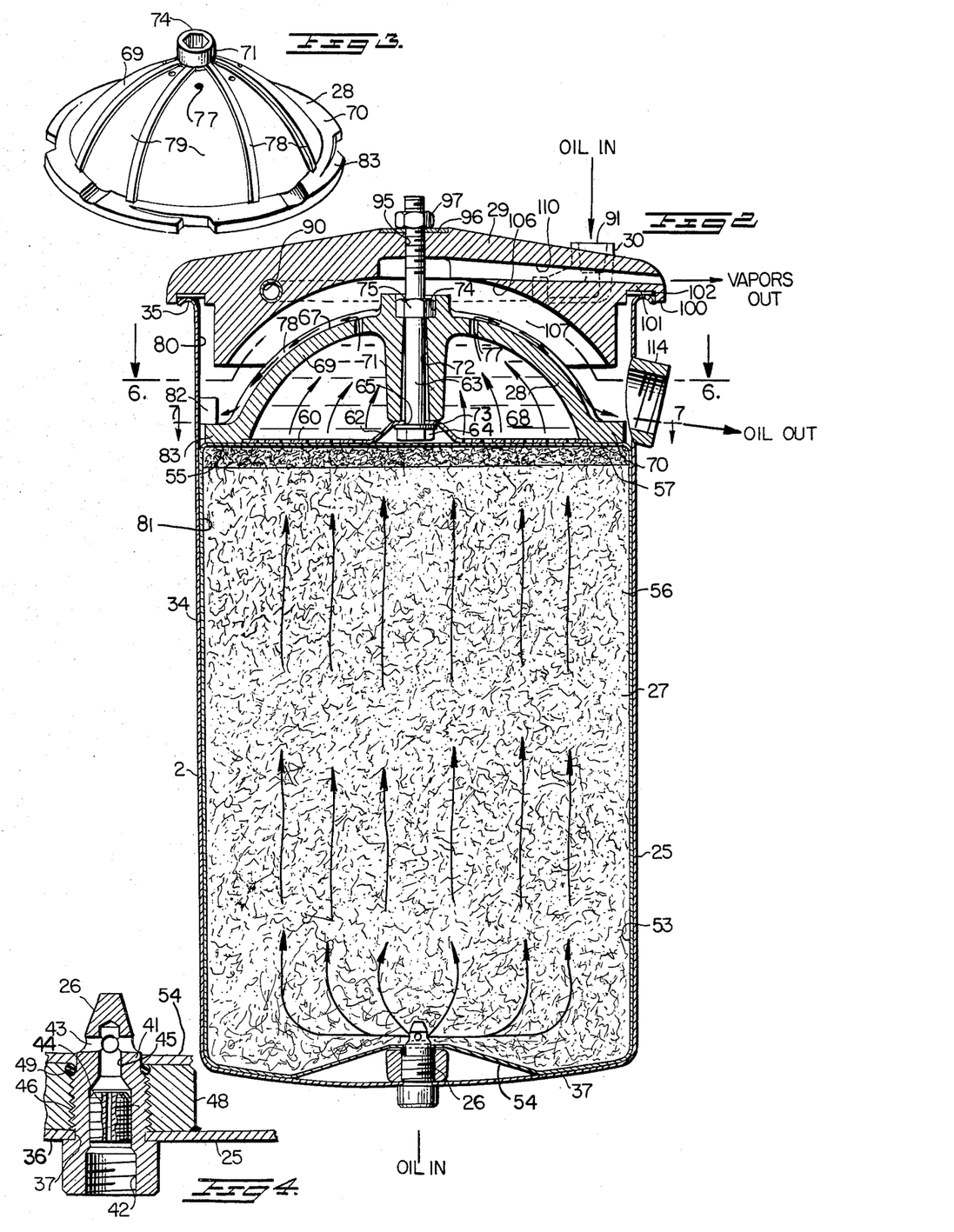
FIG. 2 is an enlarged vertical cross-sectional view of one of the oil refiners including a dispersion plate and a distribution nozzle.
FIG. 4 is a fragmentary enlarged vertical cross-sectional view of the refiner of FIG. 2 showing the distribution nozzle with portions broken away to show detail thereof.
Figure 6:
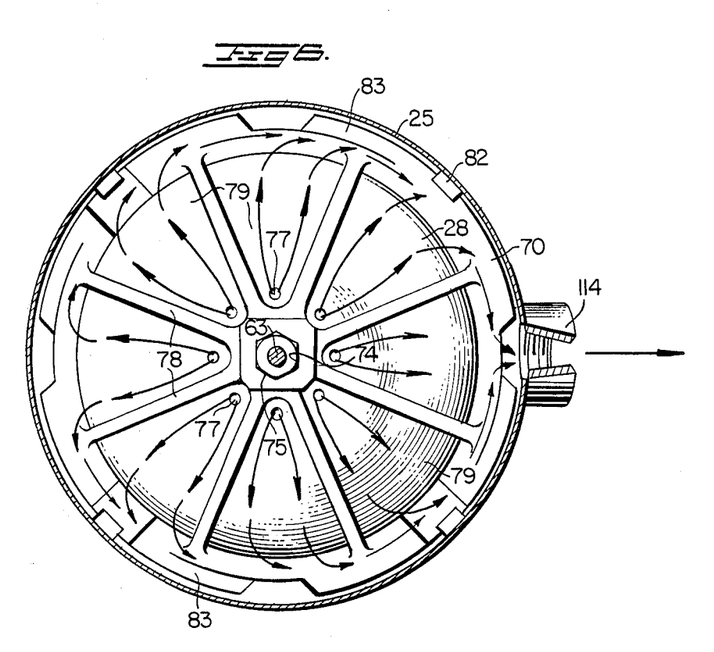
FIG. 6 is a cross-sectional view of the refiner taken along line 6—6 of FIG. 2.

As used herein, the terms "upper", "lower", "top", "vertical", "horizontal" and other common directional terms have the same meaning for the oil refiner 2 as seen in FIG. 2.

With reference to FIG. 1, the oil circulation system 1 comprises a lubricating oil using engine 5 which may be a gasoline, diesel or gas burning engine, moving machinery or the like. The engine 5 has an oil flow conducting conduit 6 extending therefrom. Oil is pumped from the engine 5 through the conduit 6 to first flow conducting means comprising a first refiner oil inlet manifold 7 by a pump 8. The first oil inlet manifold 7 evenly distributes the oil to be refined to the top of each of the refiners 2. Flow of the oil through each of the refiners 2 will be discussed in greater detail below. The oil next exits the top of each refiner 2 through a first refiner oil outlet manifold 11 wherethrough the oil flows to a conduit 12 which in turn conducts oil flow to a secod refiner oil inlet manifold 13 through which oil flows into the bottom of each refiner 2. Oil then flows again out of each refiner 2 under the force of gravity into second flow conducting or conveying means comprising a second refiner oil outlet manifold 16 wherein the oil is collected and directed into conduit 17 wherein now refined oil is conducted to a reservoir 18 for storage. Oil from reservoir 18 flows out of the bottom thereof through conduit 19 into pump 20 which supplies the refined oil to the engine 5 as required thereby. In the figures the arrows represent flow of oil through the system 1. Although oil flow from the top to the bottom of each refiner 2 is shown as flowing through common manifolds 11 and 13 and through common conduit 12, it is foreseen that a separate conduit could conduct flow from the top to the bottom of each refiner 2.

Each refiner 2 comprises a fluid containment vessel or hollow body such as a cylindrical canister or tank 25 having an oil inlet distributor 26 located in the bottom thereof, filter media 27 located in a lower portion of the tank 25, an evaporation or dispersion plate 28 located above the filter media 27, cap or hovered head 29 spaced from and above the dispersion plate 28, and heating means 30.

The refiner tank 25, as is best seen in FIG. 2, includes a cylindrical side wall 34 having a lip 35 around the top thereof and a bottom wall 35 sealably attached to the side wall 34. The bottom wall 35 includes an aperture 32 in the center thereof through which the distributor 26 passes and is sealed thereabout.

The distributor 26, as is best seen in FIG. 4, includes a distribution nozzle 41 threadably mounted in the tank bottom wall aperture 37 and having an inlet connection 42 suitable for mating with the second oil inlet manifold 13. The upper portion of the nozzle 41 is cone-shaped and has a plurality of flow interconnected and horizontal channels therein having angularly spaced outlets 43 on the exterior of the cone-shaped portion of the nozzle 41. Oil exiting the nozzle outlets 43 is directed in a generally horizontal, radial, or lateral direction. An orifice 44 is threadably mounted within the channel of the nozzle 41 so as to restrict flow through an interior channel 45 thereof. The size of the orifice 44 may be varied to compensate for variances in fluid pressure, fluid viscosity and fluid temperature. The orifice 44 may also be varied depending on the size of the refiner 2 and flow rate therethrough. An exterior portion 46 of the nozzle 41 between the tank bottom 25 and outlets 43 is threadably mounted within a retention nut or boss 48. The boss 48 may be welded or otherwise secured to the tank bottom 25. An O-ring seal 49 is positioned between an upper end of the boss 48 and the nozzle exterior portion 46.

The filter media 27 is in the form of a cartridge including an outer wall or container within which the filter media 27 is held. The outer wall may comprise a fabric sock or, as illustrated, a canister which is perforated or permeable to oil through a top portion 55 thereof. The canister 53 includes a lower centrally located raised portion 54 with suitable aperture therein for mating with the nozzle 41 and being sealed thereat by the seal 49. The upper portion of the nozzle 41 extends above the canister 53 such that nothing obstructs or blocks the flow of fluid from the outlets 43 into the filter media 27. The filter media includes a lower portion 56 and an upper portion 57. The filter media lower portion 56 is preferably a cotton fiber of long staple suitable for physical separation of heavy particles, especially particles having a size in the nature of 1 to 3 microns or greater, from the oil flowing therethrough and also suitable for absorbing other contaminants such as hydrocarbon-dilutents, moisture, and other foreign matter. Selection of the proper material so as to maximize efficiency of the filter media lower portion 56 is somewhat dependent upon the service into which the oil will be placed and the ambient conditions surrounding the oil refiner or an engine utilizing the lubricating oil. The filter media 27 should preferably also be alkaline in nature to nominally neutralize the oil if same should become acidic in nature. The nozzle 41 and the filter media 27 cooperate such that essentially all of the oil flowing through the refiner 2 must pass through a substantial portion of the filter media 27. In particular, the oil is expelled or dispersed from the nozzle outlets 43 into a region relatively near the bottom of the filter media lower portion 56 and in a relatively horizontal and radially dispersed pattern. The oil thereby flows outwardly under pressure from near the center of the filter media 27 so as to be generally evenly dispersed along the bottom thereof and thereafter flow upwardly in a generally uniform pattern without significantly channeling through the filter media 27. The filter media 27 should be sufficiently packed so as to prevent channeling of the dispersed oil therethrough. The filter media upper portion 57 preferably comprises a pad to function as a screen to allow passage of oil therethrough but to prevent any possibility of passage of fiber from the filter media lower portion 56 or any other large particles therethrough. A suitable material for the filter media upper portion 57 is a treated felt pad. The filter media canister 53 is designed to be easily accessible for replacement thereof when contamination level in the filter media has reached a predetermined level or during routine maintenance of the refiner 2. The canister 53 shown in FIG. 3 is pliable enough to easily be removed around any objects protruding from wall of the tank 25 above the canister 53; however, in an embodiment wherein the canister 53 would be rigid, the diameter thereof must be small enough to pass by any protuberances from the tank 25 and/or be vertically grooved along the side thereof where such protuberances exist.

A cover plate 60 is positioned above the filter media canister 53. The cover plate 60, as is best seen in FIG. 7, is a generally flat horizontally aligned plate having a plurality of apertures 61 therethrough and a raised center portion 62. The cover plate 60 allows flow of oil therethrough while preventing upward movement of the filter media 27. A vertically aligned bolt 63 extends upwardly from the cover plate 60. A head 64 of the bolt 63 is restricted from upward movement by the cover plate 60 and the bolt 63 passes through an aperture 65 in the cover plate raised portion 62.

The dispersion plate 28 has an arcuate upper evaporation, vaporization, or dispersion surface 67 suitable for allowing oil to flow thereover in a thin layer. Preferably the surface 67 is convex and generally symmetrical about a center thereof and is generally parabolic in vertical cross section. The illustrated dispersion plate 28, as best seen in FIGS. 2 and 3, allows oil 68 to collect under a dome shaped portion 69 thereof. In particular, the illustrated surface 67 is also dome shaped and is highest near a center thereof extending outward and downward to an outer edge or periphery thereof. As illustrated, the dispersion plate 28 also includes a foot portion 70 attached to and extending radially outward from a lower end or the periphery of the dispersion plate dome shaped portion 69. A boss or central support shaft 71 extends vertically on either side of the dispersion plate dome portion 69 near the center thereof. The support shaft 71 has an interior vertical channel 72 therethrough which receives the bolt 63 therein. A lower end of the support shaft 73 rests on and is secured to the cover plate raised portion 62 by the bolt 63. An upper portion of the support shaft 71 extends above the surface 67 and includes a receiver 74 therein. The receiver 74 holds a suitable fastener such as nut 75 therein to which the bolt 63 is secured.

The dispersion plate 28 has a plurality of angularly spaced apertures, passageways, or capillaries 77 near the top thereof. Preferably the capillaries 77 are circularly arranged and each of the capillaries 77 opens at an upper end thereof onto the surface 67 at a location slightly spaced from the upper portion of the support shaft 71. The capillaries flow communicate the upper and lower sides of the dispersion plate 28 such that oil 68 beneath the dispersion plate dome portion 69 is conducted or transferred by such conveying means to an oil receiving portion of the surface 67 in the region of the capillaries 77. A plurality of angularly spaced flow directing ridges or ribs 78 radiate outwardly along the surface 67 from the upper portion of the support shaft 71 to the outer periphery of the surface 67. The ribs 78 thus segment or separate the surface 67 into a plurality of pie shaped sections 79, each section 79 having at least one of the capillaries 77 located near an upper end thereof. The ribs 78 are interconnected at the upper end thereof by the raised upper portion of the support shaft 71 so as to form a raised enclosure around each section 79. The capillaries 77 are sized to restrict the flow of oil therethrough such that when oil exits the capillaries 77 onto the surface 67, the oil will form a relatively thin film or layer on the surface 67. Preferably the oil is pressurized beneath the dispersion plate 28 and is at substantially atmospheric pressure on the surface 67.

The dispersion plate 28 divides the tank 25 into an upper chamber 80 and a lower chamber 81. Positioned on the tank 25 are a plurality of bosses or retaining lugs 82 which mate with locking rims defining indexing lugs 83 on the dispersion plate foot portion 70. When the retaining lugs 82 and indexing lugs 83 are properly aligned, the dispersion plate will move vertically relative to the tank 25; however, when the dispersion plate is positioned between chambers 80 and 81 and rotated counterclockwise as viewed from above, the lugs 82 and 83 mesh so as to lock the dispersion plate 28 into operable position relative to the tank 25.

In the present embodiment, the heating system 30 comprises heater means contained within the tank head 29. In particular the heating system 30 includes a horseshoe shaped channel or conduit 90 which is positioned in halo fashion above and spaced from the surface 67, preferably the spacing is even and uniform between the conduit 90 and the surface 67. An inlet fitting 91 and an outlet fitting 93 are positioned on opposite ends of the conduit 90 and are suitable for mating with the first inlet oil manifold 7 and first outlet oil manifold 11 respectively. The head 29 may be cast and the conduit 90 placed therein during casting. The head 29 includes a centrally located and vertically aligned aperture 95 therethrough suitable for sleeving on the bolt 63. A seal 96 is positioned on the upper side of the aperture 95 and a suitable fastener such as nut 97 holds the head 29 in place relative to the tank 25. The head 29 is vertically movable relative to the tank 25 when the nut 97 is not positioned on the bolt 63 thereabove. The head 29 extends upwardly over the tank side wall 34 and has an outer lip 100 with a groove or seat 101 holding a seal 102 therein which seal suitably mates with the upper lip 35 of the tank 25, when the head 29 is positioned on the tank 25 and held thereon by the nut 97.

The refiner 2 includes structural means defining a chamber positioned above the surface 67. In the present illustrated embodiment the head 29 has a lower surface 106 which is substantially uniformly spaced from the surface 67 so as to form an evaporation chamber 107 therebetween. During normal operation of the refiner 2 the evaporation chamber 107 contains in particular air and volatile contaminants except for the layer of oil flowing down the surface 67. Energy in the form of heat is preferably transferred from oil in the head conduit 90 by processes of conduction, convection and radiation to the evaporation chamber 107.

The head 29 also includes an exhaust port or vent 110 which opens into the evaporation chamber 107 near the center of the head lower surface 106. The vent 110 also opens into the atmosphere air at an outer edge of the head 29 so as to provide an unobstructed exhaust passageway for gases from the evaporation chamber 107 to the atmosphere. It is foreseen that such a vent 110 could also be connected to some device or apparatus to collect the exhaust gases. The vent 110 slopes slightly downwardly from the inlet thereof at the evaporation chamber 107 to the outlet thereof on the outer edge of the head 29, such that any condensation formed in the vent 110 will tend to flow outwardly.

The tank 25 also includes conveying means such as a discharge outlet 114 positioned so that oil flowing down the surface 67 will collect and gravity flow therethrough. The discharge outlet 114 is also canted slightly downward at the outer end thereof to improve flow of oil from the evaporation chamber 107 and is suitable for mating with the second oil outlet manifold 16.

Suitable material of construction of the tank 25 may be such as 14 gauge steel plate, cast metal, high impact plastic, or the like. The material of the construction of the head 29 is preferably of a substance which is suitable for casting or molding such as aluminum, plastic or the like.

In use, oil flows from an engine 5 or suitable reservoir therefor into the first oil inlet manifold 7 and from there into the conduit in the head 29 so as to circulate therethrough. The oil flows out of the conduit 90 into the first oil outlet manifold 11 then to the second oil inlet manifold 13 from which the oil re-enters the refiner 2 through the distributor 26. The distributor 26 urges the oil to distribute evenly along the lower region of the filter media 26 such that the oil to be refined will all flow evenly upward through the filter media 27 which then removes particulate matter and at least a portion of the soluable contaminants in the oil. The oil thereafter passes through the cover plate 60 into the region between the cover plate 60 and the dispersion plate 28. The oil then flows through the capillaries 77 and is distributed upon the surface 67 so as to form a thin layer thereupon. The oil flows down the surface 67 preferably between the ribs 78 and over the dispersion plate foot portion 70 so as to collect at the oil outlet 114 through which the oil flows by force of gravity into the second oil outlet manifold 16. Although the refiner 2 is illustrated in a substantially vertical position, that is the axis of the tank 25 is vertically aligned, it is foreseen that the refiner 2 could be easily tilted, canted, or rocked from side to side such that the axis of the tank 25 would be at an angle with respect to vertical, especially when used with engines in such devices as ships and mobile machinery. When so tilted, the dome shape of the surface 67 tends to maintain an even layer on the surface 67. In addition, the ribs 78 tend to restrict the oil from flowing from one surface section 79 to an adjacent section. In this manner the oil tends to remain in a more uniform layer on the surface 67 so as to assist in the even and uniform vaporization or evaporation of volatile contaminants therefrom. As used herein, the term "volatile contaminants" is understood to comprise water, fuel fractions, and other common oil contaminants having a vaporization temperature which is substantially less than the vaporization point of oil and which is preferably less than or equal to the normal operating temperature of the oil. In particular at the essentially atmospheric pressure conditions which exist in the evaporation chamber 107 many volatile contaminants will be flashed or evaporated from the oil on the surface 67 due to the relatively high temperature of the oil which is normally in the nature of 160 degrees to 220 degrees Fahrenheit. The purpose of circulating the oil to be refined through the head conduit 90 before the oil enters the filter media 27, is to provide additional heat to the head 29 which in turn tends to heat the evaporation chamber 107. This heat provided to the evaporation chamber 107 by the oil in conduit 90 raises the temperature of the air in the evaporation chamber 107 which allows the atmosphere therein to absorb more volatile contaminants and also heats the head lower surface 106 to prevent condensation of the volatile contaminants thereon. The volatile contaminants tend to exit the evaporation chamber 107 through the vent 110 into the atmosphere.

Maintenance is performed on the refiner 2 by removing the nut 97 and vertically raising the head 29, preferably the manifolds 7 and 11 are flexible and can remain attached to the head 29 during the removal operation. Thereafter the dispersion plate 28 is rotated clockwise as viewed from above until free of the retaining lugs 83 so that the dispersion plate 28 can be raised vertically from the tank 25. At this point the filter media may be replaced by vertically raising and removing the canister 53 and replacing it with a new canister. The above process is reversed and the refiner 2 is then in condition to be again used to remove contaminants from lubricating oil.

The reference numeral 199, as seen in FIGS. 8 and 9, generally represents a refiner which is a second embodiment of the present invention having certain parts thereof modified from the embodiment shown from FIGS. 1 through 7. Since the refiner 199 is otherwise substantially the same as the previously described refiner 2, similar parts appearing in FIGS. 8 and 9, and FIGS. 1 through 7 respectively are represented by the same, corresponding references numeral except for the addition of the suffix "a" to the numerals of the second embodiment.

The refiner 199 includes a distributor 200 mounted in the center of the bottom of a tank 25a. The distributor 200 has an upper flanged portion which rests on the bottom of the tank 25a and a lower threaded portion which is threadably received in a boss or retaining nut 201 or the like. A nipple 202 projects downwardly from the distributor 200 and receives thereon a hose 203 secured thereto by a clamp or the like. The hose 203 is connected with a second oil inlet manifold similar to that of the manifold 13 shown in FIG. 1. An O-ring 205 seals between the distributor 200 in the tank 25a. A spring washer 207 tends to support filter media 27a and prevent oil from bypassing the filter media 27a.

The filter media 27a of the present embodiment is contained within a semirigid canister 215. The canister 215 has a centrally located raised bottom portion 216 which surrounds the distributor 200 and which has openings 217 therein for allowing oil to flow therethrough. Oil flows upward from the distributor 200 through the apertures 217 and is relatively evenly distributed through the filter media 27a. The canister 215 has a removable top 218 with a crimped periphery 219. A seal 220 is received in the canister top crimped periphery 219 and seals between the canister 215 and a dispersion plate 225. The canister top 218 is porous or permeable to oil so as to allow flow of the oil therethrough.

The dispersion plate 225 of the present invention is similar in shape to the dispersion plate 28 of the previous invention except that ribs 226 are positioned thereon, each of which ribs 225 are arcuate, serpentine, or spiral in shape. The ribs 226 define therebetween curved segments or sections 227 on a surface 67a. The dispersion plate 225 also includes passageways or capillaries 77a having wider or cupped portions 228 at the top thereof so as to further reduce the flow rate of oil before reaching the surface 67a. The illustrated embodiment in FIG. 8 also includes a nipple 231 attached to an oil outlet 114a. The nipple 231 is connected to a hose 232 by clamp or other suitable means. The hose 232 is part of a second oil outlet manifold which may be similar to the manifold 16 of the first embodiment.

In use, the refiner 199 of the second embodiment is similar to that of the first embodiment with the exception that the spiral shape of the ribs 226 tends to make the refiner 199 even more insensitive to tilting or rocking with regards to evaporation of all of the volatile contaminants from the surface 67a. It is noted that the canister 215 of the present embodiment must be somewhat smaller in diameter than the tank 25a as the canister must be able to clear lugs 82a on the inner surface of the tank 25a when the canister 215 is vertically raised relative to the tank 25a so as to replace the former.

It is to be understood that while certain embodiments of the present invention have been illustrated and described herein, it is not to be limited to specific forms or arrangement of parts herein described and shown.

What is claimed and desired to secure by Letters Patent is:

1. A refiner for removing contaminants from lubricating oil comprising:
   (a) a fluid containment vessel having a top and a generally vertical axis.
   (b) a plate removably secured in said vessel and dividing said vessel into an upper chamber and a lower chamber; said plate having an upper surface; said surface having a domed shape with a generally smooth arcuate configuration and being raised in a center portion thereof above the remainder thereof; said plate also having a plurality of passageways extending from a lower side of said plate whereat said passageways communicate with said lower chamber to said surface near said center portion thereof;
   (c) filter media located in said vessel lower chamber;
   (d) first conducting means for delivering the oil to said vessel and communicating with said vessel lower chamber such that oil entering said vessel passes through said filter media, then through said passageways, and then flows over said surface;
   (e) second conducting means for removing the oil from said vessel after the oil has passed over said dispersion plate; and
   (f) venting means for exhausting said vessel upper chamber;
   (g) whereby solid contaminents in the oil are substantially removed by said filter media and whereby volatile contaminents in the oil are substantially removed by evaporation while the oil is on said surface in a thin uniform manner even when said vessel axis is canted from vertical and the evaporated volatile contaminants are exhausted from said vessel upper chamber by said venting means.

2. The refiner according to claim 1 including:
   (a) heater means for improving evaporation of the volatile contaminants from the oil and being positioned near said dispersion plate.

3. The refiner according to claim 2 wherein said heating means comprises:
   (a) a fluid conducting channel through said vessel top; and wherein
   (b) said channel communicates with said first conducting means such that the oil prior to passage thereof through said filter media flows through said channel whereby said vessel top is heated by the oil.

4. The refiner according to claim 1, 2 or 3 including:
   (a) a plurality of fluid flow directing ribs positioned on said surface; each of said ribs extending from near said surface center portion to near a periphery of said surface; said ribs dividing said surface into a plurality of sections such that oil flowing over adjacent sections is substantially restricted from mixing; each of said sections having oil supplied thereto by at least one of said passageways.

5. The refiner according to claim 4 wherein:
   (a) each of said ribs is interconnected near one end thereof; said interconnected end of each rib being near said surface center portion.

6. The refiner according to claim 4 wherein:
   (a) said ribs are spiral shaped.

7. The refiner according to claim 1 wherein:
   (a) said filter media has a surrounding cartridge; said cartridge with said filter media therein being replaceable in said vessel whereby said filter media is replaced as a single unit.

8. The refiner according to claim 1 including:
   (a) distribution means for uniformly distributing the oil from said first conducting means throughout a bottom region of said filter media.

9. The refiner according to claim 8 wherein:
   (a) said distribution means comprises a nozzle having a plurality of angularly spaced outlets; each of said outlets being positioned to direct the oil from said first conducting means in a generally lateral direction.

10. In a cylindrical oil refiner having an axis and having a dispersion surface over which oil flows such that volatile contaminants are evaporated evenly from the oil into a surrounding chamber, which chamber is vented to exhaust the evaporated volatile contaminants; the improvement comprising:
    (a) said surface being domed shape and having a plurality of apertures therethrough for delivering oil to said surface; said dome having an oil receiving center portion relatively higher than the remainder of the surface during normal operation; and including
    (b) a plurality of flow directing ribs positioned on said surface; said ribs being interconnected and radially extending from near said surface center portion to near said surface periphery and being angularly spaced, whereby said surface is divided into a plurality of sections; at least one aperture positioned near said center portion opening into each of said sections such that oil flowing over adjacent sections is restrained from mixing;
    (c) whereby oil flows substantially uniformly from said center portion over said surface to a periphery thereof even when said oil refiner axis is canted from vertical.

11. The refiner according to claim 10 wherein:
    (a) said ribs are spiral shaped.

* * * * *